Jan. 12, 1932.  J. DAGAND  1,840,936
CHEESE PRESS
Filed March 15, 1930  2 Sheets-Sheet 1
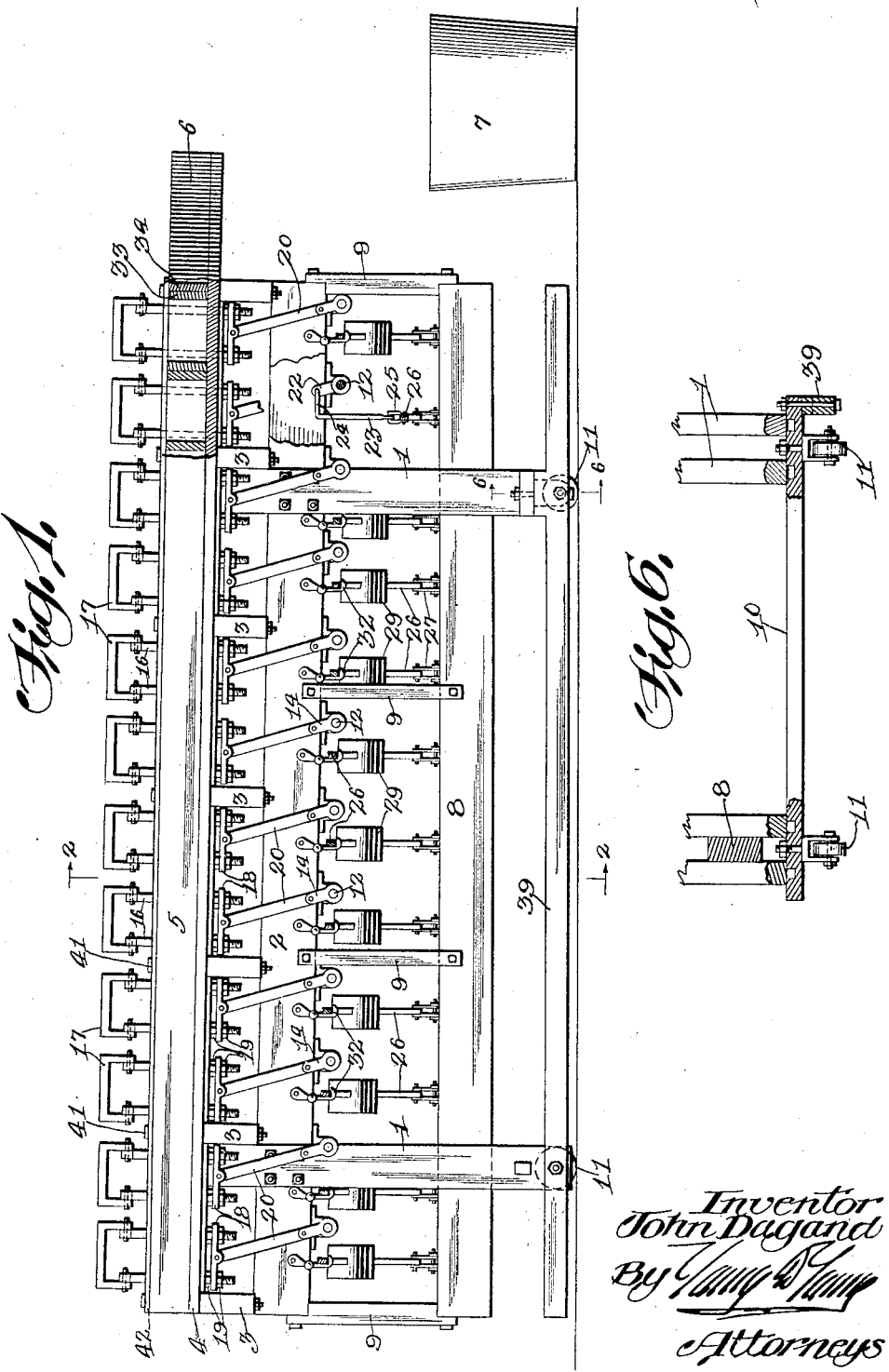

Jan. 12, 1932.                    J. DAGAND                    1,840,936
                                 CHEESE PRESS
                        Filed March 15, 1930      2 Sheets-Sheet 2
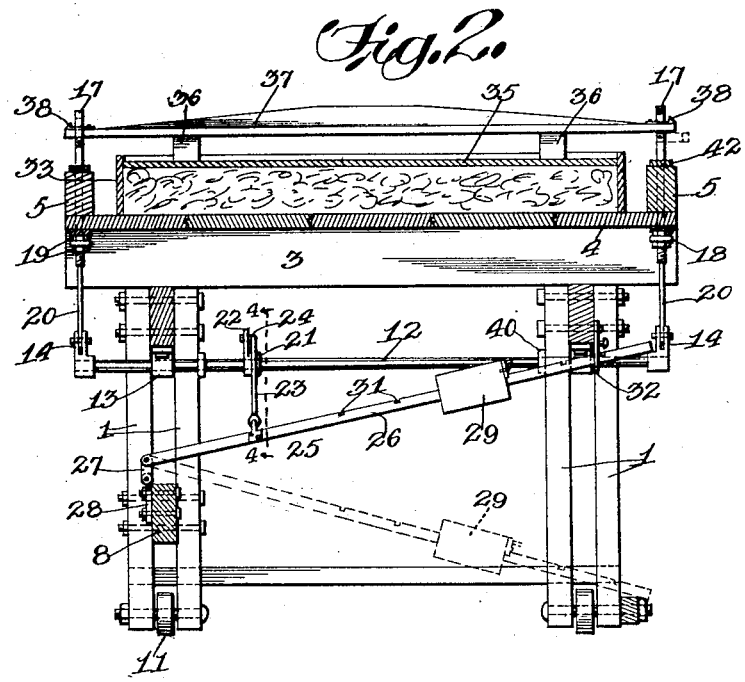
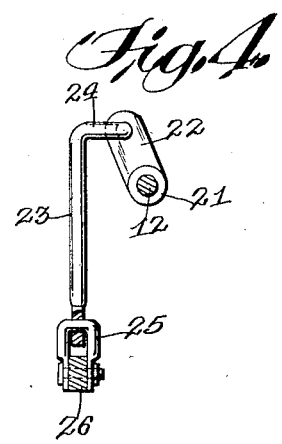
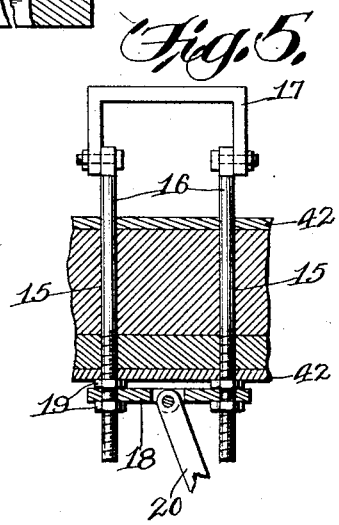
Inventor
John Dagand
By [signature]
Attorneys Patented Jan. 12, 1932

1,840,936

UNITED STATES PATENT OFFICE

JOHN DAGAND, OF ALBANY, WISCONSIN

CHEESE PRESS

Application filed March 15, 1930. Serial No. 436,109.

This invention relates to improvements in cheese presses.

One of the objects of my invention is the provision of an improved cheese press to be used for the making and forming of different kinds of cheese and incorporating in its construction novel means for applying an even pressure to the cheese blocks or bricks, and whereby a continuous pressure is applied to the cheese for slowly compressing it into brick or block formations.

Another object of my invention is the provision of a cheese press including means for applying the proper pressure to the curd which is placed within suitable molds or forms so as to favor the work of ferments thus subsequently imparting a good flavor to the cheese.

A further object of the invention is the provision of an improved cheese press wherein the application of pressure to the curd is even throughout the entire block or brick of curd which will result in a uniform moisture content and provide a uniform shape in the brick or block after the pressing is finished.

A still further object of the invention is the provision of a cheese press wherein the operative parts thereof are so assembled that they are entirely out of the way of the block supporting platform so as to leave the latter easily accessible for cleansing the press.

With the above and other objects in view, the invention consists in the novel features of construction, the combination and arrangements of parts hereinafter more fully set forth, pointed out in the claim and shown in the accompanying drawings wherein:

Figure 1 is a side elevation of a multiple cheese press constructed in accordance with my invention;

Figure 2 is a transverse sectional view taken on the line 2—2 of Figure 1;

Figure 3 is a side elevation of one of the weights, illustrating the means for locking the same in position;

Figure 4 is a sectional view on the line 4—4 of Figure 2;

Figure 5 is a detail section through one of the sides of the platform, illustrating the mounting of the clamping member; and, Figure 6 is a detail section on the line 6—6 of Figure 1.

In the construction of my improved cheese press, I provide a supporting frame with a press or block platform carried by the frame. The frame consists of four corner supporting uprights each including spaced posts 1. These corner uprights are connected by means of the longitudinal side members 2 adjacent the upper ends of the uprights. Transversely of the side members 2 I provide a plurality of platform supporting beams 3, upon which is arranged the platform 4 and along each longitudinal edge of the platform are the beams 5. The beams 5 are connected at one end in any suitable manner and have at their forward ends inclined guide boards 6, which form a discharge mouth for one end of the platform, preferably disposed above a receiving tub 7 which receives the drained whey from the pressing platform.

Arranged between two of the members 1 at each end and at one side of the frame is a longitudinal beam 8 which is not only bolted to the upright members 1, as shown in Figure 2, but is also connected to the longitudinal beams 2 by means of brace members 9 arranged at spaced intervals throughout the frame, as shown in Figure 1. At the lower end of the upright members, I provide transverse braces 10 and each of the uprights are provided with traction wheels 11 whereby the frame may be easily moved from place to place.

Extending transversely of the frame are a plurality of transverse shafts 12, each shaft being mounted in the bearings 13 attached to the lower edges of the two side beams 2. The outer ends of shafts 12 have mounted upon each end the bifurcated arms 14. Each of the platform beams 5 is provided with a plurality of pairs of spaced openings 15 and slidably mounted in these openings are the bolts 16 arranged in pairs, as shown in Figures 1 and 5, with the U-shaped yoke 17 pivotally connected to the upper ends of each pair. Adjustably mounted upon the lower ends of each pair of bolts 16 is a cross bar 18 retained in adjusted position upon the bolts by means of the jamb nuts 19.

Pivotally connected to each cross bar 18 is a connecting arm 20 which extends downwardly upon a slight angle as shown in Figure 1, and is pivotally connected in the bifurcation of each of the arms 14, thus connecting the movable bolts 16 with the shaft 12.

Each shaft 12 has keyed thereto a collar 21 and extending at an angle from the collar 21 is an arm 22. A link member 23 has its upper end disposed at right angles as shown at 24 and loosely connected with the outer end of arm 22.

The lower end of link 23 is loosely connected to a clevis member 25 attached to the weight supporting lever 26. The weight supporting lever 26 has one end pivotally connected to a hinge link 27 pivotally mounted upon the longitudinal beam 8 and connected to this beam by means of a plate 28. Adjustably mounted upon the lever 26 is a weight 29, retained in various adjusted positions upon the lever by means of a pivoted catch 30 carried by the weight and adapted to engage in any one of the notches 31 formed in the lever. Each one of the weight levers 26 is supported in a raised inactive position, as shown in Figure 2, by means of pivoted hooks 32 carried by one of the longitudinal side beams upon the opposite side of the frame from the beam 8.

In pressing cheese blocks with my improved machine, as described above, it will be apparent that the cheese boxes indicated at 33 are placed upon the platform with the first box arranged in abutting relation with the stopper plate 34 at the forward end of the platform, and the boxes are arranged in contacting relation throughout the length of the platform if it is desired to press a number of cheese blocks at the same time. It will be understood, however, that any number of blocks may be used in this machine. After the blocks have been placed in position, the boxes are filled with the curd and the cover plates 35 are then placed upon top of the curd with suitable spacing blocks 36 arranged upon the cover plates and upon which the press bars 37 are mounted. It will be noted that the blocks 36 are arranged in equal spaced relation so that an even pressure from the press bars 37 is applied to the cover plates 35.

After the press bars have been arranged in an operative position, the yokes 17 are swung upwardly to a substantially vertical position, as shown in Figures 2 and 5 engaging behind the latch members 38 on the ends of the press bars.

After the curd has been arranged in the boxes and the press bars placed in position with the yokes 17 engaging the ends of the press bars, the weights 29 can be adjusted along the levers 26 according to the amount of pressure to be applied to the curd. The levers 26 are then released by detaching hooks 32 from the outer ends thereof and as the weights move downwardly, the moisture is pressed from the curd. It will be noted, however, that a steady even pressure is applied to the curd, thus providing a uniform moisture content to the cheese block, the fluid pressed from the curd running toward the tapered end of the platform and being deposited in the tub 7. At this point, I wish to call attention to the fact that the closed end of the platform opposite the tapered members 6 is somewhat higher than the front end, thus positively assuring the fact that the fluid will flow toward the front end and be deposited in the tub 7.

After the levers 26 have been urged downwardly to the dotted line position shown in Figure 2, by means of the weight 29, the outer ends of the levers will engage the longitudinal stop bar 39 which is connected to the lowermost portions of the uprights 1 at one side of the frame. The shafts 12 are provided with stop collars 40 upon the inner sides of the uprights 1 so as to retain these shafts 12 in their relative positions at all times and prevent axial movement of the said shafts.

In constructing the platform, it will be noted that the longitudinal beams 5 are connected to the transverse beams 3 by means of bolts 41 which also pass through the longitudinal edges of the platform and suitable strap irons 42 are arranged upon the upper edges of the beams 5 to prevent constant wear of the heads of the bolts on the upper edges of the beams, also under the edges of the platform, see Figure 5.

It will be apparent from the foregoing, that I have provided a cheese press, the construction of which is comparatively simple when taken in connection with the results accomplished, whereby a plurality of cheese blocks may be simultaneously pressed and the application of pressure to the blocks is uniform at all times, assuring uniform moisture content and a uniform shape for the blocks. After the pressing has been finished, the weight levers 26 can be raised and supported by the hooks 32, this movement returning arms 22 and 14 to their uppermost position which in turn will simply disengage the yokes 17 from the ends of the press bars, it being understood that during the pressing operation, the shafts 12 are rotated through their connection with the weight levers 26 and the rotation of shafts 12 will pull downwardly upon each pair of bolts 16 through the connection of arms 14 on the shafts.

I claim:

A cheese press including an inclined portable platform, side beams along the longitudinal edges of said platform, adjustable bolts arranged in pairs and slidably mounted through said beams and platform, press bars transversely of the platform, yokes carried by the upper ends of the pairs of bolts and adapted to engage the ends of the press bars, latch members at the ends of the bars to retain the yokes in position, rotatable shafts supported beneath the platform, lateral arms at the ends of the shafts, means connecting the arms with the pairs of bolts, pivoted levers beneath the platform, adjustable weights on said levers, and means forming operative connection between the shafts and the levers for imparting rotative movement to the shafts by adjustment of the weights on the levers whereby to apply an even pressure to the press bars through the movement of said bolts.

In testimony that I claim the foregoing I have hereunto set my hand at Albany, in the county of Green and State of Wisconsin.

JOHN DAGAND.